(12) United States Patent
Park

(10) Patent No.: US 9,945,468 B2
(45) Date of Patent: Apr. 17, 2018

(54) TECHNIQUE FOR MEASURING TORQUE OUTPUT OF HARMONIC DRIVE

(71) Applicant: Hyundai Motor Company, Seoul (KR)

(72) Inventor: Jun Hwan Park, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 990 days.

(21) Appl. No.: 14/293,379

(22) Filed: Jun. 2, 2014

(65) Prior Publication Data

US 2015/0153240 A1   Jun. 4, 2015

(30) Foreign Application Priority Data

Dec. 3, 2013   (KR) ........................ 10-2013-0149553

(51) Int. Cl.
*F16H 49/00*   (2006.01)

(52) U.S. Cl.
CPC .................................. *F16H 49/001* (2013.01)

(58) Field of Classification Search
CPC ............................... F16H 49/00; F16H 49/001
USPC ............ 74/640; 73/862.29, 862.31, 862.321, 73/862.333, 862.338
See application file for complete search history.

(56) References Cited

U.S. PATENT DOCUMENTS

| | | | | |
|---|---|---|---|---|
| 3,881,347 A | * | 5/1975 | Buchele | G01L 3/14 73/862.195 |
| 4,384,493 A | * | 5/1983 | Grunbaum | G01L 3/1492 73/862.29 |
| 4,584,884 A | * | 4/1986 | Lesko | G01L 3/14 73/862.195 |
| 6,840,118 B2 | * | 1/2005 | Godler | G01L 3/1464 73/862.325 |
| 7,140,994 B2 | * | 11/2006 | Mundis | B66C 23/84 475/158 |
| 7,891,272 B2 | | 2/2011 | Schonlau | |
| 2002/0026852 A1 | * | 3/2002 | Kiyosawa | F16H 49/001 74/640 |
| 2004/0261545 A1 | * | 12/2004 | Kanayama | G01L 3/1457 73/862.326 |
| 2005/0253675 A1 | | 11/2005 | Davison | |
| 2008/0110287 A1 | | 5/2008 | Schonlau | |
| 2015/0008800 A1 | * | 1/2015 | Freshour | G01L 3/108 310/68 B |

FOREIGN PATENT DOCUMENTS

| | | |
|---|---|---|
| KR | 1988-0009227 | 9/1988 |
| KR | 10-1991-0000987 B1 | 1/1991 |
| KR | 10-2006-0126418 A | 12/2006 |

(Continued)

*Primary Examiner* — William C Joyce
(74) *Attorney, Agent, or Firm* — Mintz Levin Cohn Ferris Glovsky and Popeo, P.C.; Peter F. Corless

(57) ABSTRACT

A harmonic drive includes: an input shaft connected to a first element that is one of a wave generator, a flex spline, or a circular spline; a drive housing connected to the input shaft via a bearing; a load cell that is installed in any one of the drive housing, the input shaft, or the wave generator and measures an axial load that occurs and is translated from the wave generator to the input shaft or the drive housing via the input shaft; and a processor that reversely calculates output torque, which is output from a second element that is one of the two elements other than the first element, from the axial load measured by the load cell.

7 Claims, 2 Drawing Sheets

(56) References Cited

FOREIGN PATENT DOCUMENTS

| KR | 10-2012-0046703 A | 5/2012 |
| KR | 10-1208406 | 12/2012 |
| KR | 10-1280291 B1 | 7/2013 |

* cited by examiner

[FIG.1]
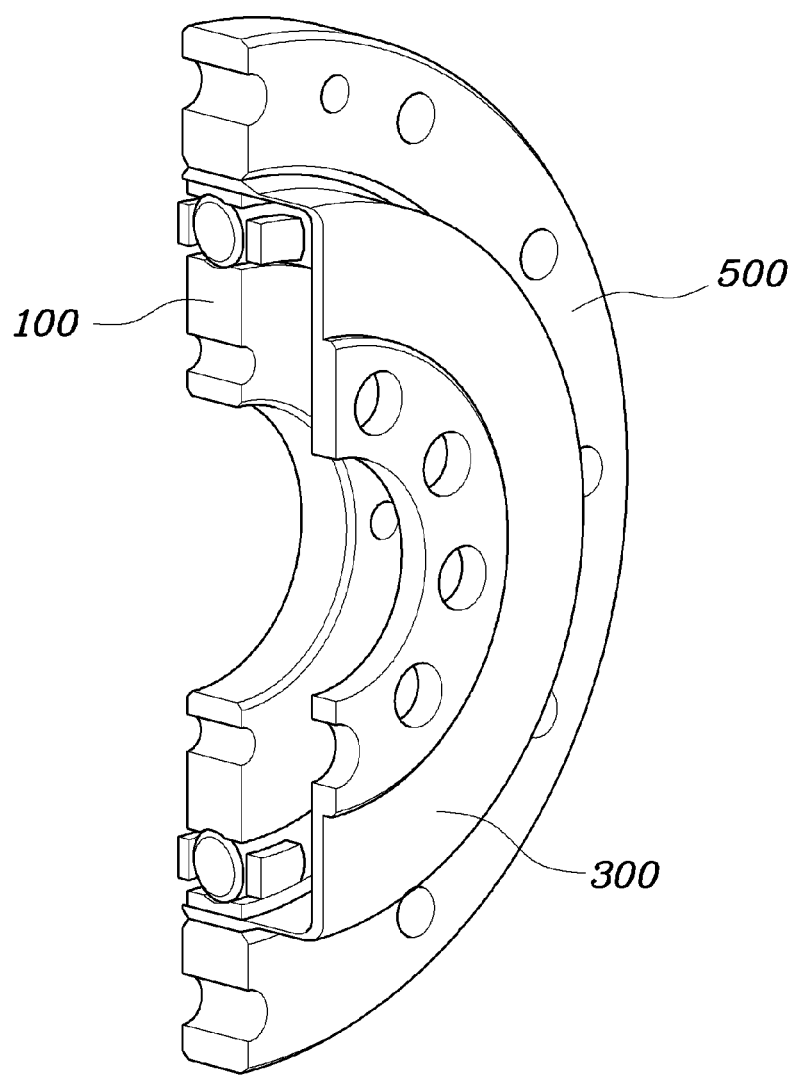

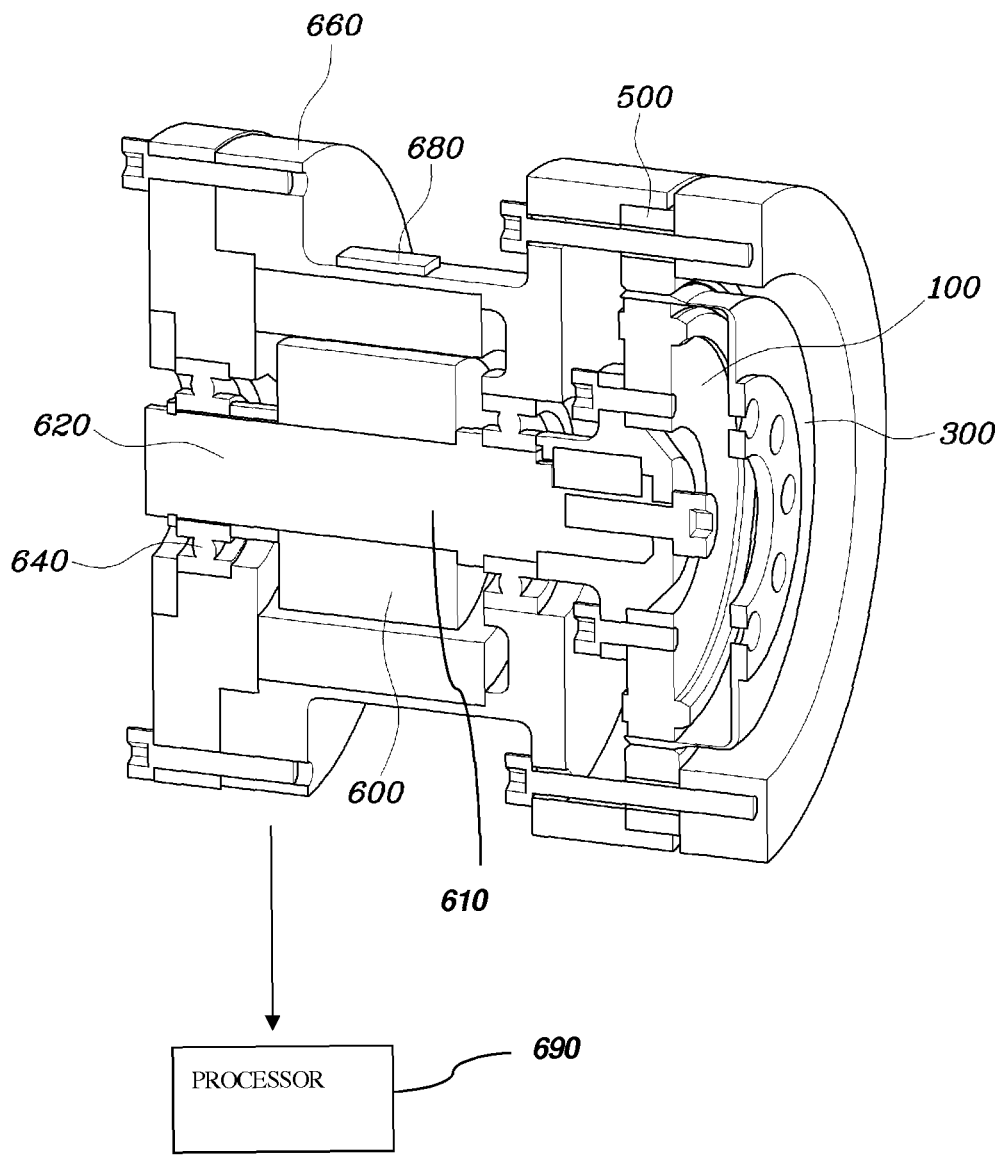
[FIG.2]

TECHNIQUE FOR MEASURING TORQUE OUTPUT OF HARMONIC DRIVE

CROSS REFERENCE TO RELATED APPLICATION

The present application claims priority of Korean Patent Application No. 10-2013-0149553 filed on Dec. 3, 2013, the entire contents of which is incorporated herein for all purposes by this reference.

BACKGROUND OF THE INVENTION

Field of the Invention

The present invention relates to a harmonic drive capable of measuring an axial force generated from a wave generator thereof, thereby allowing output torque to be measured without a torque cell.

Description of the Related Art

Harmonic drives can improve certain characteristics of a motion translation compared to traditional gearing systems (such as helical gears or planetary gears). In general, a harmonic drive (also known as "strain wave gearing") is generally made up of three basic components: a wave generator, a flex spline, and a circular spline. In a harmonic drive, the wave generator typically has an elliptical shape, and is installed inside the flex spline, and the flex spline in which the wave generator is mounted is installed on an inner circumferential surface of the circular spline. The inner circumferential surface of the circular spline and an outer circumferential surface of the flex spline are generally toothed in order to prevent sliding.

In these types of systems, it is important that the output torque be measured. Currently, this is done via the torque cell. However, as the output torque is increased, the rigidity of the torque cell increases as well. As such, a volume/weight of the torque cell should be increased as a result. In addition, an additional member for restricting the torque cell to one degree of freedom is required, and this also increases the volume/weight. Thus, since inertia of the output stage is increased, responsiveness of a system is degraded by the current measuring techniques.

The foregoing is intended merely to aid in the understanding of the background of the present invention, and is not intended to mean that the present invention falls within the purview of the related art that is already known to those skilled in the art.

SUMMARY OF THE INVENTION

Accordingly, the present invention has been made keeping in mind the above problems occurring in the related art, and the present invention is intended to provide a harmonic drive capable of measuring an axial force generated from a wave generator thereof, thereby allowing output torque to be measured without a torque cell.

In order to achieve the above object, according to one aspect of the present invention, there is provided a technique for measuring a torque output of a harmonic drive that includes: an input shaft connected to a first element that is one of a wave generator, a flex spline, and a circular spline; a drive housing connected to the input shaft via a bearing; a load cell that is installed in any one of the drive housing, the input shaft, or the wave generator and measures the axial load that occurs and is translated from the wave generator to the input shaft or the drive housing via the input shaft; and a processor that is configured to reversely calculate output torque, which is output from a second element that is one of the two elements other than the first element, from the axial load measured by the load cell.

As such, in some exemplary embodiments of the present invention, the input shaft may be fixed to a rotor of a driving motor. Additionally, the drive housing may be formed to enclose a side of the input shaft, and be configured so that a rear end thereof is connected to a rear end of the input shaft via a bearing, and a front end thereof is fixed to the circular spline.

Further, as to the processing, the processor may be configured to reversely calculate the output torque from an equation below:

$$F = 2 \times T/D \times 0.07 \times \tan(a)$$

Where F is an axial load, T is output torque, D is a correction coefficient, and a is a constant according to a reduction ratio.

In addition, in some exemplary embodiments of the present invention the first element may be the wave generator, and the second element may be the flex spline.

Advantageously, according to the harmonic drive having the structure as described above, the output torque of the driving module can be measured without the torque cell. Due to the removal of the torque cell, the volume/weight of the driving module can be reduced. Further, the degree of freedom of design is increased. Further, the number of parts associated with the driving module can be reduced, and the responsiveness of the system can be improved by reducing the inertia of the output stage. In addition, since the magnitude of the axial load changes according to a reduction/acceleration state, a change in load of the output stage can be measured.

BRIEF DESCRIPTION OF THE DRAWINGS

The above and other objects, features and other advantages of the present invention will be more clearly understood from the following detailed description when taken in conjunction with the accompanying drawings, in which:

FIG. 1 shows main parts of a harmonic drive according to an exemplary embodiment of the present invention; and FIG. 2 shows an entire configuration of the harmonic drive according to the exemplary embodiment of the present invention.

DETAILED DESCRIPTION OF THE INVENTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles, fuel cell vehicles, and other alternative fuel vehicles (e.g. fuels derived from resources other than petroleum).

Additionally, it is understood that the below methods are executed by at least one controller. The term controller refers to a hardware device that includes a memory and a processor configured to execute one or more steps that should be interpreted as its algorithmic structure. The memory is configured to store algorithmic steps and the processor is specifically configured to execute said algorithmic steps to perform one or more processes which are described further below.

Furthermore, the control logic of the present invention may be embodied as a tangible non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

As discussed above, the present invention is directed to easily measuring output torque at a driving module that is associated with a harmonic drive. As discussed above, in conventional torque output measuring systems, as the output torque is increased, rigidity of the torque cell is must be increased as well. As such, a volume/weight of the torque cell is increased as a result. In addition, an additional member for restricting the torque cell to one degree of freedom is generally required, and increases the volume/weight. Thus, since inertia of the output stage is increased, responsiveness of a system is degraded. As such, according to the present invention provides a technique for measuring the output torque of the harmonic drive without the torque cell.

Hereinbelow, an exemplary embodiment of the present invention will be described in detail with reference to the accompanying drawings.

FIG. 1 shows main parts of a harmonic drive according to an exemplary embodiment of the present invention, and FIG. 2 shows an entire configuration of the harmonic drive according to the exemplary embodiment of the present invention.

A technique and apparatus for measuring the torque output of a harmonic drive according to an exemplary embodiment of the present invention includes: an input shaft connected to a first element that is one of three elements, i.e. a wave generator, a flex spline, and a circular spline; a drive housing connected to the input shaft via a bearing; a load cell that is installed in any one of the drive housing, the input shaft, or the wave generator and measures an axial load that occurs and is translated from the wave generator to the input shaft or the drive housing via the input shaft; and a processor that is configured to reversely calculate output torque, which is output from a second element that is one of the two elements other than the first element, from the axial load measured by the load cell.

In the following embodiment, the first element is described as the wave generator, and the second element is described as the flex spline. However, it is apparent that the scope of the present invention is not limited to the following embodiment alone.

In the embodiment of the present invention as shown, an input shaft 620 is connected to a wave generator 100, and a drive housing 660 is connected to the input shaft 620 via a bearing 640. A load cell 680 is installed in the drive housing 660 and measures an axial load applied to the drive housing 660 in an axial direction. Additionally, a processor 690 is configured to reversely calculate output torque, which is output from a flex spline 300, from the axial load measured by the load cell 680.

In this case, when an external significant load is applied to the output side, i.e. the flex spline, the harmonic drive reversely functions as a speed increaser, so that the wave generator can operate as the output side.

Meanwhile, the harmonic drive in the exemplary embodiment of the present invention is made up of the circular spline 500, the flex spline 300, and the wave generator 100 as shown in FIG. 1, as is the case in a typical harmonic drive. An input according to driving of a motor is translated to the wave generator 100, and an output is translated through the flex spline 300. The circular spline 500 is fixed in a provided position.

FIG. 2 shows the entire harmonic drive in detail. The harmonic drive according to the embodiment of the present invention includes: the input shaft 620 connected to the wave generator 100; the drive housing 660 connected to the input shaft 620 via the bearing 640; the load cell 680 that is installed in the drive housing 660 and measures the axial load applied to the drive housing 660 in an axial direction; and the processor 690 that reversely calculates the output torque, which is output from the flex spline 300, from the axial load measured by the load cell 680. Additionally, an intermediate portion 610 of the input shaft 620 may be fixed to a rotor 600 of the driving motor.

The drive housing 660 may be formed to surround a side of the input shaft, is configured so that a rear end thereof is connected to a rear end of the input shaft 620 via a bearing 640, and a front end thereof may be fixed to the circular spline 500.

Furthermore, in the exemplary embodiment of the present invention, the processor can reversely calculate the output torque from an equation below.

$$F = 2 \times T/D \times 0.07 \times \tan(a)$$

where F is an axial load, T is output torque, D is a correction coefficient, and a is a constant according to a reduction ratio.

In existing harmonic drive systems, the driving module restricts all the degrees of freedom excluding the degree of freedom in a direction of the output shaft, and the torque cell is installed on the output shaft. As such, the output torque of the harmonic drive should be actually verified.

The present invention, however, relates to a technique of measuring the axial load applied to the wave generator and measuring the output torque. In the harmonic drive, a axial load is applied in a direction of the output shaft by rotation/revolution of the wave generator, and a direction & magnitude of the axial load generated from the wave generator is changed according to an acceleration/reduction direction of the wave generator.

As in the shown in the exemplary embodiment, the wave generator is designed so that a single bearing supports an axial force thereof. The load cell is attached to the housing in which a single bearing is located. When the input is zero (0), the strain of the housing is adjusted to a zero point. Here, when the input shaft is rotated, the wave generator connected to the input shaft receives the axial load, and the axial load is translated to the housing via the input shaft and the bearing and as such, the strain of the housing is measured.

Since the axial load has a proportional relation with the output torque as in the equation below, the output torque can be reversely calculated with the strain of the housing which is measured by the load cell.

$$F = 2 \times T/D \times 0.07 \times \tan(a)$$

where F is an axial load, T is output torque, D is a correction coefficient that is an experimental value determined according to the harmonic drive, and a is a constant according to a reduction ratio.

Further, since the magnitude of the axial load changes according to a reduction/acceleration state, a change in load of the output stage can be measured.

Thereby, the output torque of the driving module can be measured without the torque cell. Due to the removal of the torque cell, the volume/weight of the driving module can be reduced. Further, the degree of freedom of design is increased.

In addition, the number of parts of the driving module can be reduced, and the responsiveness of the system is improved by reducing the inertia of the output stage.

Although the exemplary embodiment of the present invention have been described for illustrative purposes, those skilled in the art will appreciate that various modifications, additions and substitutions are possible, without departing from the scope and spirit of the invention as disclosed in the accompanying claims.

What is claimed is:

1. A harmonic drive system comprising:
   an input shaft connected to a first element that is one of a wave generator, a flex spline, or a circular spline;
   a drive housing connected to the input shaft via a bearing;
   a load cell that is installed on any one of the drive housing, the input shaft, or the wave generator and measures an axial load that occurs and is translated from the wave generator to the input shaft or the drive housing via the input shaft; and
   a processor configured to reversely calculate output torque, which is output from a second element that is one of the two elements other than the first element, from the axial load measured by the load cell
   wherein the processor reversely calculates the output torque by utilizing an equation below:

$$F = 2 \times T/D \times 0.07 \times \tan(a)$$

when F is an axial load, T is output torque, D is a correction coefficient, and a is a constant according to a reduction ratio.

2. The harmonic drive system according to claim 1, wherein the input shaft is fixed to a rotor of a driving motor.

3. The harmonic drive according to claim 1, wherein the drive housing surrounds a side of the input shaft, and is configured so that a rear end thereof is connected to a rear end of the input shaft via a bearing, and a front end thereof is fixed to the circular spline.

4. The harmonic drive system according to claim 1, wherein the first element is the wave generator, and the second element is the flex spline.

5. A method for measuring a torque output of a harmonic drive system, the method comprising:
   measuring, by a load cell installed on any one of a drive housing, an input shaft, or the wave generator, an axial load that occurs and is translated from the wave generator to the input shaft or the drive housing via the input shaft, wherein the input shaft is connected to a first element that is one of the wave generator, a flex spline, or a circular spline;
   calculating, by a processor, an output torque, which is output from a second element that is one of the two elements other than the first element, from the axial load measured by the load cell; and
   reversely calculating, by the processor, the output torque by utilizing an equation below:

$$F = 2 \times T/D \times 0.07 \times \tan(a)$$

where F is an axial load, T is output torque, D is a correction coefficient, and a is a constant according to a reduction ratio.

6. The method according to claim 5, wherein the first element is the wave generator, and the second element is the flex spline.

7. The method according to claim 5, wherein control logic configured to execute the calculating step is stored on a non-transitory computer readable medium.

* * * * *